US012671257B1

(12) United States Patent
Charette et al.

(10) Patent No.: US 12,671,257 B1
(45) Date of Patent: Jun. 30, 2026

(54) HYBRID ELECTRICAL POWER GENERATOR AND BATTERY CHARGING SYSTEM

(71) Applicant: NISHATI, INC., Gilbert, AZ (US)

(72) Inventors: Robert J. Charette, Queen Creek, AZ (US); Richard A. Schilke, Clover, SC (US); Travis P. Kelley, Glendale, AZ (US)

(73) Assignee: NISHATI, INC.., Gilbert, AZ (US)

( * ) Notice: Subject to any disclaimer, the term of this patent is extended or adjusted under 35 U.S.C. 154(b) by 0 days.

(21) Appl. No.: 19/404,425

(22) Filed: Dec. 1, 2025

Related U.S. Application Data

(63) Continuation of application No. 19/368,440, filed on Oct. 24, 2025.

(60) Provisional application No. 63/748,230, filed on Jan. 22, 2025.

(51) Int. Cl.
| | |
|---|---|
| *H02J 7/16* | (2006.01) |
| *H02J 7/82* | (2026.01) |
| *H02K 7/18* | (2006.01) |
| *H02P 9/02* | (2006.01) |

(52) U.S. Cl.
CPC ................. *H02J 7/16* (2013.01); *H02J 7/82* (2026.01); *H02K 7/1815* (2013.01); *H02P 9/02* (2013.01)

(58) Field of Classification Search
CPC ...... H02J 7/16; H02J 7/82; H02J 7/90; H02K 7/1814; H02P 9/02
See application file for complete search history.

(56) References Cited

U.S. PATENT DOCUMENTS

| | | | | |
|---|---|---|---|---|
| 4,845,419 A | * | 7/1989 | Hacker ................... | G06F 1/263 |
| | | | | 320/136 |
| 5,952,815 A | * | 9/1999 | Rouillard .................. | H02J 7/54 |
| | | | | 320/122 |
| 6,274,942 B1 | * | 8/2001 | Pels .......................... | H02J 1/14 |
| | | | | 290/40 C |
| 6,700,214 B2 | * | 3/2004 | Ulinski ..................... | H02J 7/34 |
| | | | | 322/17 |
| 6,700,802 B2 | * | 3/2004 | Ulinski ............. | H02M 3/33584 |
| | | | | 307/66 |
| 7,742,855 B2 | * | 6/2010 | Louise ...................... | H02P 9/02 |
| | | | | 307/10.6 |
| 10,587,254 B2 | * | 3/2020 | Park .......................... | H02P 9/48 |
| 10,644,587 B2 | * | 5/2020 | Spindler ............... | H01M 10/44 |
| 12,316,225 B2 | * | 5/2025 | Womac ..................... | G05F 1/59 |
| 2002/0041502 A1 | * | 4/2002 | Ulinksi ..................... | H02J 3/32 |
| | | | | 363/37 |

(Continued)

*Primary Examiner* — Tulsidas C Patel
*Assistant Examiner* — Thomas K Quigley
(74) *Attorney, Agent, or Firm* — Bycer & Marion, PLC; Matthew L. Bycer

(57) ABSTRACT

A power generating system comprising an electrical generating set and a modulator configured to maintain optimal voltage regulation under varying load conditions. The system includes a controllable current power source; an active rectifier coupled to the controllable current power source, configured to rectify an output of the controllable current power source to supply utility-grade power or for recharge of a battery or batteries. A controller is configured to adjust at least one of the parameters of the controllable current power source and/or supply from the generator and a parameter of the active rectifier in response to a target output.

6 Claims, 2 Drawing Sheets

(56)  References Cited

U.S. PATENT DOCUMENTS

| | | | | |
|---|---|---|---|---|
| 2002/0051368 A1* | 5/2002 | Ulinski | .................... | H02J 7/34 |
| | | | | 363/1 |
| 2002/0117860 A1* | 8/2002 | Man | ......................... | B60K 6/48 |
| | | | | 903/910 |
| 2006/0066106 A1* | 3/2006 | Yang | ....................... | F23C 13/00 |
| | | | | 290/1 A |
| 2008/0084182 A1* | 4/2008 | Oberlin | .............. | H01M 10/052 |
| | | | | 320/116 |
| 2008/0238362 A1* | 10/2008 | Pinnell | ..................... | H02J 7/90 |
| | | | | 320/155 |
| 2010/0327816 A1* | 12/2010 | Chiang | .................... | H02J 7/02 |
| | | | | 320/145 |
| 2014/0265560 A1* | 9/2014 | Leehey | .................. | B60L 58/13 |
| | | | | 307/10.1 |
| 2015/0180393 A1* | 6/2015 | Tesch | ..................... | H02P 9/007 |
| | | | | 322/29 |
| 2015/0349387 A1* | 12/2015 | Inaba | .................... | H01M 10/44 |
| | | | | 700/297 |
| 2016/0094171 A1* | 3/2016 | Syngaevskiy | ............. | H02P 9/02 |
| | | | | 322/28 |
| 2016/0322896 A1* | 11/2016 | Davis | ...................... | H02M 1/32 |
| 2017/0066531 A1* | 3/2017 | McAdoo | ................. | B64C 27/26 |
| 2017/0317626 A1* | 11/2017 | Leone | ................ | F02D 41/0225 |
| 2018/0086419 A1* | 3/2018 | Crain | .................. | H02K 7/1807 |
| 2018/0109117 A1* | 4/2018 | Spindler | ............ | H02M 1/4233 |
| 2018/0167007 A1* | 6/2018 | Pallett | .................. | F02D 41/123 |
| 2019/0089278 A1* | 3/2019 | Turpin | ..................... | H02P 9/04 |
| 2020/0052580 A1* | 2/2020 | Spindler | ................. | H02J 7/02 |
| 2020/0083706 A1* | 3/2020 | Paskov | .................... | H02J 1/10 |
| 2021/0273526 A1* | 9/2021 | Kadiri | ................. | H02H 7/0844 |
| 2022/0243631 A1* | 8/2022 | Swart | ................... | F01N 3/2013 |
| 2023/0120432 A1* | 4/2023 | Womac | .................... | G05F 1/59 |
| | | | | 323/282 |
| 2023/0268856 A1* | 8/2023 | Jones | ...................... | F02D 29/06 |
| | | | | 322/44 |

* cited by examiner

HYBRID ELECTRICAL POWER GENERATOR AND BATTERY CHARGING SYSTEM

CLAIM OF PRIORITY

The present continuation application includes subject matter disclosed in and claims priority to U.S. patent application Ser. No. 19/368,440, filed Oct. 24, 2025, entitled "Hybrid Electrical Power Generator and Battery Charging System"; which claims priority to U.S. provisional patent application Ser. No. 63/748,230, filed Jan. 22, 2025, entitled "Hybrid Electrical Power Generator And Battery Charging System", both incorporated herein by reference, and which describe inventions made by the present inventors.

BACKGROUND OF THE INVENTION

1. Field of the Invention

The present invention relates to a power generation system, and particularly to an electrical generating set with a modulator configured to maintain optimal voltage regulation under varying load conditions.

2. Description of Related Prior Art

A genset, or "generator set," is a portable power supply system that includes an engine and an electrical generator. Gensets provide electricity without requiring access to the electric power grid, and may convert chemical energy from diesel, gas, or other fuels. While the terms "generator" and "genset" are often used interchangeably, a generator is a component of a genset, while a genset is a complete, self-contained unit that produces electricity. A genset typically includes a prime mover, which is usually an internal combustion engine that provides mechanical energy, a generator or alternator that converts mechanical energy into electrical energy, a control system for monitoring and management, and a fuel system for fuel storage and delivery.

Gensets are often used in scenarios where grid power is unavailable or unreliable, such as in field military applications, as well as for emergency backup systems for hospitals, data centers, shopping malls, or industrial facilities. Gensets also function to support and supplement the electric grid, for example, by providing peak shaving through reducing the maximum electrical demand a facility places on the power grid during periods of peak usage. Gensets currently known in the art may deliver direct current (DC) or alternating current (AC) power. AC power may be preferred for remote installations, where alternating current is required to power systems, particularly at high voltage, such as telecommunications sites.

The generator or alternator component of a genset is typically a wound field synchronous generator, which converts an engine's mechanical energy into electrical energy to deliver active power. Generators also produce reactive power, which supports voltage stability and enables the transfer of active power in systems with inductive or capacitive loads. Synchronous generators may be subpar as they may experience efficiency drops when supplying inductive loads due to increased losses in excitation and armature circuits. Synchronous generators may also experience power quality issues and reduced efficiency. Additionally, capacitive loads can create voltage instability in synchronous generators.

Gensets currently known in the art present several additional limitations, particularly in military and other such remote environments. Field operations, such as battlefields and military camps, demand compact, lightweight, modular, and rugged power generators that can be easily transported, assembled, and scaled. Current field-deployable generators are often oversized for actual needs, leading to low loading levels (which reduce efficiency and contribute to wet stacking, a condition in which unburned fuel and carbon deposits accumulate in the generator) due to prolonged low-load operation. Wet stacking leads to increased fuel waste, higher maintenance requirements, and premature equipment failure.

Additionally, even "portable" or "mobile" gensets are often too large and heavy for deployment by small units, as they still require handling equipment such as forklifts. The reliance on these "portable" gensets limits combat flexibility, decreases small-unit mobility, and results in power reliability gaps in distributed operations.

Another limitation of gensets currently known in the art is the delayed response time between genset initiation and power availability. After a genset shuts down, restarting it can involve significant delays, transient control issues, and a lack of power output until it reaches full operational capability. This problem is exacerbated when low-state-of-charge lithium-ion batteries are incorporated into the system. During startup, high power draw from lithium-ion batteries can cause voltage spikes that overload the engine, potentially causing a stall. Additionally, if the genset utilizes a diesel engine, the restart may be slow and inefficient.

To address the issues described above, there is a great need for compact, modular DC hybrid power architectures capable of maintaining a stable voltage during power draws. Such systems may integrate proven diesel technology with modern controls and interfaces, while being portable, scalable, and adaptable to integrate other DC power sources, such as solar panels or wind turbines. These capabilities are especially critical in supporting highly distributed small units or teams operating across large geographic areas, often with limited resupply options or hazardous, environmentally challenging resupply lines that are vulnerable to hostile interdiction. Such systems are vital for ensuring energy resilience in the context of Multi-Domain Operations (MDO) and Expeditionary Advanced Base Operations (EABO), where operational flexibility and energy security are critical. Modular DC hybrid power architectures may also mitigate the environmental damage caused by gensets that rely solely on fossil fuels and other polluting energy sources. In such hybrid systems, as discussed above, a power module, typically featuring a DC/AC inverter, such as a sine-wave voltage source inverter (or an SVSI), converts energy from supplementary DC sources into usable AC power for local microgrids or equipment loads. The sine-wave voltage source inverter may convert DC power into AC power by converting a DC input voltage to an AC sine wave output by rapidly running DC power through semiconductor power switches, such that the switches rapidly turn on and off to create a series of pulses simulating a sine wave, resulting in an AC sine wave output. Such hybrid configurations reduce fuel consumption and improve efficiency, particularly in remote or tactical settings.

A generator set may charge at least one Lithium-ion (Li-ion) battery. Lithium-ion batteries operate through a reversible electrochemical reaction, wherein lithium ions move between an anode and a cathode through an electrolyte during charging and discharging cycles.

During the charging cycle of a lithium-ion battery, lithium ions deintercalate from the cathode, which may be, but is not necessarily, a lithium metal oxide such as $LiCoO_2$, $LiMn_2O_4$, or $LiFePO_4$, and migrate through the electrolyte to intercalate into the anode. In some embodiments, the anode may be constructed from graphite or other carbon-based materials. Additionally, electrons simultaneously travel through an external circuit, thereby preserving charge neutrality. During discharge, the process reverses, whereby lithium ions flow back to the cathode while electrons travel through the external circuit, delivering electrical energy to the device.

Lithium-ion batteries are best when operated with minimal resistance. Internal resistance may be due to both ionic resistance, the movement of lithium ions through the electrolyte and electrodes, and electronic resistance, the movement of electrons through conductive pathways. High resistance may lead to voltage drops under load, energy loss as heat, reduced power output, and accelerated degradation of cell materials. Therefore, lithium-ion batteries may be engineered to minimize these resistive losses. For example, the electrodes may be constructed from highly conductive materials, such as, but not limited to, graphite for the anode and metal oxide for the cathode. Sometimes the electrodes may be further enhanced with conductive additives to improve electron flow.

Additionally, to further minimize resistance, the electrolyte may be formulated as a liquid or gel, allowing lithium ions to move between electrodes with minimal obstruction. Separators, which are thin, porous membranes that keep the anode and cathode from contacting each other and causing a short circuit, are designed to be as thin as possible, thereby shortening the distance ions must travel and further reducing ionic resistance. Furthermore, lithium-ion batteries may be designed to optimize electrode materials by using smaller particle sizes and increasing the electrode's surface area, thereby shortening the diffusion path for ions and contributing to lower resistance.

The electrolyte is formulated to have high ionic conductivity, and electrode materials are optimized to facilitate fast charge transfer reactions, thereby reducing internal battery resistance. Such a reduction in resistance may optimize the voltage supplied by the battery. Therefore, lithium-ion batteries, with reduced resistance, are particularly efficient at supporting high discharge currents with minimal voltage drop.

However, the same low resistance properties that enable a lithium-ion battery to efficiently provide power create a challenge during charging, particularly when the battery is at a low state of charge. When charging a battery or other such load having a low state of charge, the low internal resistance of a depleted lithium-ion battery, or other such load, may cause a surge in current draw at the onset of charging. Such sudden demand can result in a voltage drop, potentially overwhelming the generator and causing the engine to stall.

Engine stalling resulting from current spikes that exceed the engine's power band may impair a generator set's ability to maintain continuous power delivery to a connected load. High current or load may induce engine spin-down, control system reinitialization, and voltage stabilization, all of which may introduce poor running or stall.

When stalling events occur frequently, as is common when charging lithium-ion batteries from a state of low charge, such compounded delays may substantially reduce the functionality of the generator, limiting the generator's capacity to sustain consistent charging output. In systems relying on generator-driven battery charging, such as those in military settings, interruptions can result in prolonged charge times, reduced system reliability, or no recharge at all, as the generator's power output is exceeded.

Restart delays following engine stalling can occur for several reasons. One contributing factor may be that after a shutdown; an engine may need time to come to a complete stop. During the initial shutdown period, when fuel flow ceases, rotating components such as the flywheel and alternator continue to spin. Attempting to restart before the system has fully stopped, while these components are still in motion, may damage internal hardware and/or interfere with the control logic.

Another significant issue arises when a stall occurs due to a spike in current. If the generator attempts to restart without first reducing the electrical load, the sustained demand results in a current draw that exceeds the generator's restart capacity. Such an excessive load during restart can cause a significant voltage drop, thereby inhibiting excitation buildup and preventing the alternator from developing sufficient field strength to reestablish operation. Without a load-shedding mechanism, the generator remains unable to synchronize with the system, such that rotating components, such as the flywheel and alternator, continue spinning out of phase with the generator. Thereby, leading to repeated failed restart attempts and increased thermal and mechanical stress on both the generator and the control system.

Excessive load-induced RPM decay due to engine stalling, as described above, may hinder efficient fuel combustion and cause the engine to operate under an excessive fuel-to-air ratio. In some embodiments, as an engine slows or stalls, airflow through the engine intake drops sharply, while fuel injections continue at a rate disproportionate to the changing air intake. The imbalance between fuel and air intake may cause the engine to operate under an excessive fuel-to-air ratio, resulting in incomplete combustion. The excessive fuel-to-air ratio may cause the engine to burn rich fuel, producing black, carbon-laden exhaust, particulate pollution, exhaust system fouling, and carbon accumulation within the generator. Over time, burning rich fuel may also result in internal coking of engine components, having effects similar to those caused by wet-stacking, which occurs when cylinder temperatures are too low for complete combustion. It is, therefore, an object of the present invention to provide a genset system and method capable of maintaining an optimized engine power band to provide continuous current during very high power draws that exceed the capability of the genset continuous rate load, resisting engine stalling, delivering reliable, immediate power in operational settings, integrating with large battery formats such as Li-Ion sources, and offering a modular and portable solution that require no external lifting equipment (e.g. two person movable). These and other objects of the present invention will become apparent to those skilled in the art as the description thereof proceeds.

SUMMARY

Described herein is a generator set system that includes an engine coupled with an alternator, a variable voltage regulator coupled to the alternator, and a control system connected to the variable voltage regulator and configured to monitor and respond to deviations in power demand and deviations in engine revolutions per minute. When power demand deviates from a threshold level, the control system signals the variable voltage regulator to modulate the voltage output from the alternator. When the control system detects deviations in engine revolutions per minute, outside of a preset range, the control system is configured to signal the engine to disconnect and reconnect export power in a cyclic pattern. The control system includes a control interface.

The engine may be coupled to a controller unit, such that the controller unit may initiate the engine. The engine may operate in at least one operating mode. The controller unit may be configured to provide a plurality of selectable operating modes and to initiate engine operation in a selected operating mode. At least one operating mode is configured to activate the control system to monitor and modulate deviations in current output, and at least one operating mode is configured to override the control system, such that when such an operating mode is selected, voltage output is not modulated.

The control system adjusts the generator output voltage by controlling the variable voltage regulator, such that the generator output voltage is modulated in a stepwise or cyclical manner based on the monitored electrical load (current) and engine operating conditions. The control system may include sensors and software, such that the sensors may continuously monitor current output data. The software receives the monitored data and programs the controller to "pulse" or modulate generator voltage as needed to maintain a target engine power band, preventing stalls or rough generator running. The control system may be configured to turn on/off power output by disconnecting and reconnecting export power cyclically when RPM drops beyond a predetermined threshold.

When the control system detects a current draw beyond a predetermined high threshold, e.g., in excess of approximately eighty or eighty-five amperes, the variable voltage regulator modulates the voltage output from the alternator, causing the output to temporarily cycle within a range bounded by two voltage levels e.g. between twenty and forty volts, or between approximately twenty-six volts and twenty-nine volts, until the amperage draw stabilizes at or near a preferred amperage, e.g. approximately seventy-five amperes.

The software is configured to monitor current output. When the current output exceeds a preset threshold, the software is programmed to command the alternator's variable voltage to modulate the voltage, producing a pulsing effect. The control system is configured with sensors to monitor the engine's revolutions per minute. When the number of revolutions per minute drops below a programmed limit, the control system triggers export power to disconnect and reconnect periodically until the number of revolutions per minute returns to a predetermined threshold.

When direct communication with a lithium-ion Battery Management System (BMS) is available, the software may adjust charging parameters in real time based on BMS data, such as BMS-requested voltage The duration of the pulsing intervals may be established in response to the electrical load demand and engine capacity. The control system may modulate the voltage regulator to increase current output in short-duration pulses or longer as the load decreases.

The control system software is configured to modulate the generator output voltage in a stepwise manner via a variable voltage regulator. The software defines a minimum voltage supported by the voltage regulator and establishes a target voltage set point. Upon detection of an excess current condition, the software commands the voltage regulator to reduce the output voltage to the defined minimum voltage and subsequently increase the output voltage toward the target voltage set point.

The control system software is configured to detect an excess load condition by continuously monitoring generator output current and comparing the monitored current to a predetermined threshold, and wherein an excess load condition is determined when the monitored current exceeds the threshold. Upon detection of an excess load condition, the control system software commands the variable voltage regulator to reduce the output voltage and subsequently restore the voltage toward a predefined target voltage set point in a stepwise manner.

The rate of voltage restoration toward the target voltage set point is varied based on electrical load demand, such as based on real-time measurements of engine rotational speed and electrical load demand. The software monitors the engine's revolutions per minute and disconnects export power if the revolutions per minute fall below a predefined threshold. It then reconnects export power once the revolutions per minute stabilize within user-specified limits. To adjust the voltage, the control system commands the variable voltage regulator to adjust the current supplied to a rotor field coil of the alternator to control the alternator output voltage in response to excess load conditions.

A method for preventing engine stall in a generator set includes coupling an engine to an alternator, coupling an alternator to a variable voltage regulator, and programming the variable voltage regulator with a control system that is configured to monitor and respond to deviations in power demand and deviations in engine revolutions per minute. When power demand deviates from a threshold level, the control system signals the variable voltage regulator to modulate the voltage output from the alternator, and when the control system detects deviations in engine revolutions per minute, outside of a preset range, the control system is configured to signal the engine to disconnect and reconnect export power in a cyclic pattern.

The control system software modulates the generator output voltage in a stepwise manner via a variable voltage regulator. The software defines a minimum voltage supported by the voltage regulator and establishes a target voltage set point. Upon detection of an excess current condition, the software commands the voltage regulator to reduce the output voltage to the defined minimum voltage and subsequently increase the output voltage toward the target voltage set point. The control system signals software to prompt the variable voltage regulator to modulate alternator voltage by adjusting the current supplied to a rotor field coil of the alternator, the alternator having a rotor with an electromagnet.

DETAILED DESCRIPTION

Figure 1:
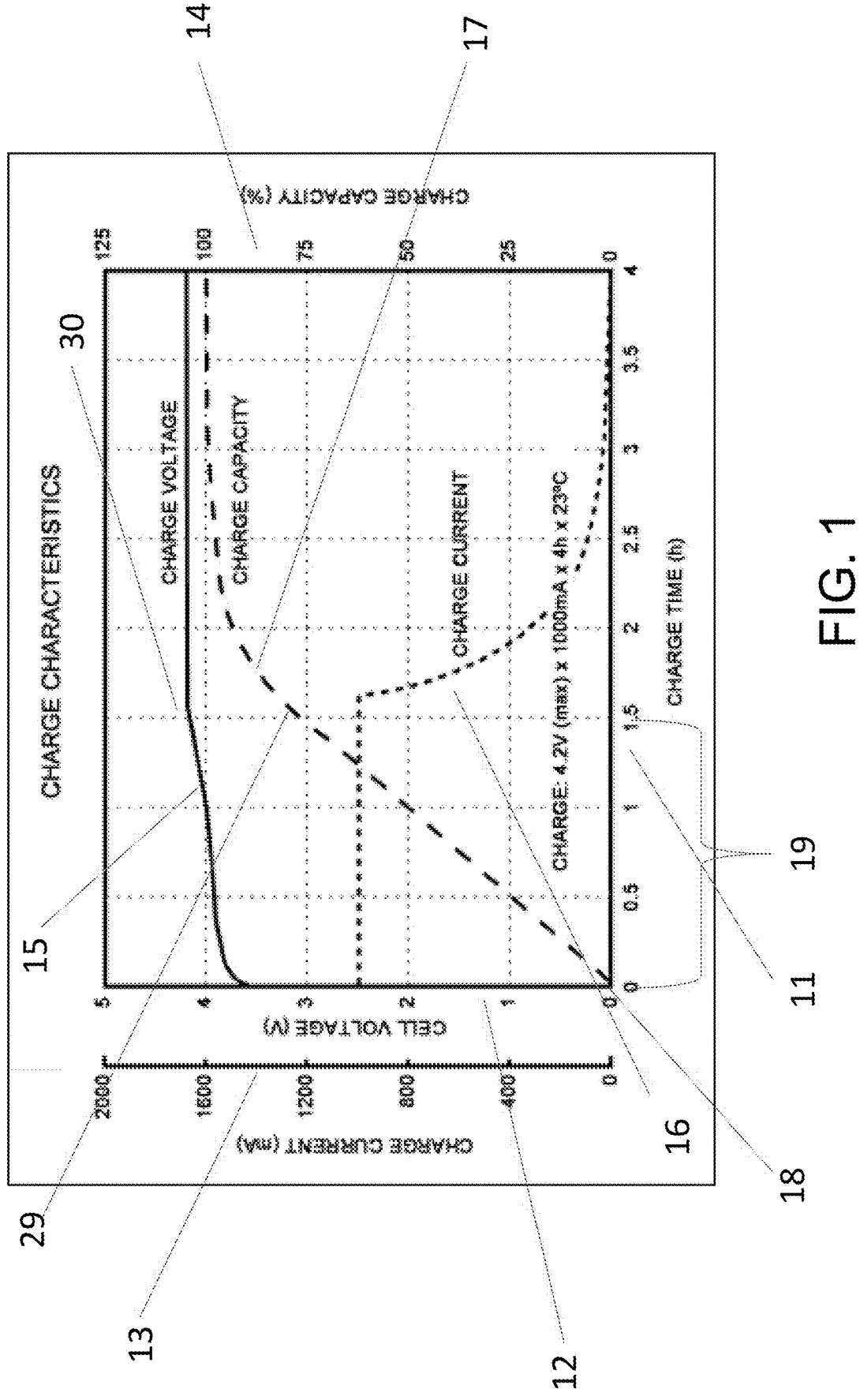
FIG. 1 is a graph illustrating changes in current, voltage, and state of charge over time when charging a standard lithium-ion battery.

A generator set may provide electric power, functioning as a means for charging a battery, or, in some embodiments, as a direct power source. Generator sets currently known in the art may include a fuel system, an engine or motor, and an alternator. In some embodiments, particularly those embodiments preferred for military settings, the generator set may include an internal combustion engine that converts stored chemical energy, such as jet fuel, into mechanical energy, which drives an alternator to generate electrical energy. In some embodiments, wherein a generator set is configured to charge a battery, the generator set may be further configured to include a rectifier, such that the rectifier may convert the AC power generated by the alternator into DC power suitable for charging batteries or operating other DC loads.

In some preferred embodiments, once a restart is triggered, the generator may undergo a multi-step startup sequence, which may include, but is not limited to, fuel priming, glow plug heating (such as for diesel engines), battery checks and relay initialization, and engine crank and RPM stabilization. Such startup sequences may take several seconds. When voltage modulations are frequent, as in cases where resistance drops and current draw spikes, repeated restarts may significantly reduce effective generator power output. In some embodiments, when shutdown occurs abruptly or under high load demand, some engines may also require an additional cooldown period before restarting.

In military and other scenarios requiring continuous or near-instantaneous power delivery including, but not limited to, battery charging systems, medical equipment, mission critical systems, and hybrid applications with variable loads, such delays may severely compromise the performance of the generator set. Accordingly, the present disclosure provides a system and method for generating power that withstands fluctuations in electrical load without stalling and without necessitating repeated engine reactivation.

As described herein, excessive voltage differential across a motor or engine circuit can result in excessive current draw, potentially leading to overheating, stalling, or loss of function. Unlike voltage, current is not directly imposed upon the motor; rather, it is inherently drawn in proportion to the applied voltage and mechanical load. Accordingly, protective regulation may be achieved by controlling the applied voltage, thereby limiting voltage differential and constraining the resulting current draw within safe operating limits. It is worth noting, that in some alternative embodiments, current-limiting safeguards may be employed to account for transient conditions such as startup, sudden load variation, or battery disconnection.

In some embodiments, software, preferably coupled to sensors within a controller, may be programmed to modulate generator voltage output. The software may manage generator power output according to a predetermined or user-defined target voltage. In preferred embodiments, the software may continuously regulate generator output to maintain substantially constant voltage, thereby preventing sudden spikes in current demand that could otherwise lead to engine stalling.

The software may manage the power delivered from the gen-set to the load or battery by varying the voltage draw pattern, thereby adjusting the output power and/or disconnecting and reconnecting export power for short periods, which results in a "pulsing" voltage. Pulsing, as defined herein and seen in FIG. 2, refers to a control strategy in which the gen-set intermittently adjusts the voltage and, in extreme cases, applies and removes connections to the electrical load, in short intervals. By "pulsing" or rapidly changing the bus voltage to counter large current draws from high loads and rapidly cycling the power output on and off, the system preferably limits instantaneous current draw, thereby reducing the likelihood of engine stall due to overloading and voltage spikes.

In preferred embodiments, output voltage may be precisely controlled and adjusted in response to spikes in current draw. Voltage may be modulated in real time, such that voltage may be precisely decreased and increased as necessary. In some embodiments, when current draw is extreme, the load may be automatically disconnected, preferably for a brief period. In preferred embodiments, such load disconnection is infrequent, as real-time voltage modulation effectively prevents engine stalling.

Pulsing may be controlled by software and sensors within a microcontroller. In some embodiments, the software may be configured to program the alternator's variable voltage regulator, described further herein, to modulate load output, thereby creating a pulsing effect that helps prevent current spikes and engine stalling. Preferably, the control software monitors the generator's output current and voltage in real time. When the current exceeds a preset threshold, the software may trigger the regulator to reduce the voltage, thereby mitigating the risk of engine stall.

In preferred embodiments, voltage may be modulated in a stepwise manner within the operating limits of the alternator's variable voltage regulator, such that the voltage regulator is configured to support a defined minimum voltage. In some embodiments, a target voltage set point may be established in the control system software. Upon detection of an excess current condition, the output voltage may be reduced to the minimum voltage supported by the variable voltage regulator, after which it may immediately increase toward the predefined set point voltage.

Additionally, in preferred embodiments. When engine RPM drops below a programmed limit, the software may trigger export power to disconnect, irrespective of the size of the load, preferably, for a preset time, after which the system may reconnect. Once RPM is maintained, within the specified limits, voltage may continue to cycle until the set point voltage can be consistently maintained.

Such a disconnect in export power may provide a protective mechanism that prevents engine overload. By disconnecting export power when engine RPM drops below a programmed limit, the system reduces the load on the engine during periods of instability, such as but not limited to high demand. The pause in export power may enable the engine to recover without the burden of powering external loads, thereby avoiding potential stalling or damage.

Such a disconnect in export power may provide a protective mechanism that prevents engine overload, without materially detracting from the average amperage supplied to the load. In preferred embodiments, the disconnect may be configured as a short-duration, "pulsed" event, such that power export is quickly resumed as soon as engine stability is regained. Accordingly, the disconnect prevents stalling or damage without materially extending the overall time required to charge or supply the external load.

In preferred embodiments, the control software monitors engine RPM and, upon detecting a drop below a programmed threshold, initiates a disconnection of export power, regardless of load size, for a preset duration. After this delay, the system attempts to reconnect. Once engine RPM is stabilized within defined limits, the software resumes voltage cycling until the target set point voltage is consistently maintained.

In some embodiments, the delay between the export power pause and reconnection may enable the engine to stabilize before resuming power export. Once RPM is maintained within acceptable parameters, the system may resume voltage cycling toward the target set point.

In preferred embodiments, the pulsing behavior of the generator system is controlled based on the relationship between the electrical load demand, as measured by current (amperage), and the generator's mechanical capacity, characterized by available engine horsepower. The control system is configured to modulate the generator output voltage in a stepwise or cyclical manner, wherein the output voltage is periodically reduced, in real time, when the measured current exceeds predetermined thresholds. This modulation prevents overloading of the engine and reduces the risk of engine stall. As the state of battery charge increases, resulting in a corresponding decrease in load demand, the generator may be capable of maintaining the programmed set point voltage for longer durations before current again exceeds allowable limits. Therefore, the duration between voltage changes or pulses may increase as there is reduced operational strain on the generator.

In some embodiments, wherein direct communication with a lithium-ion Battery Management System (BMS) is available, the software may adjust charging parameters in real time based on BMS data, including but not limited to BMS-requested voltage. Although battery state of charge percentage may not be directly used to determine voltage modulation behavior, the state of charge percentage may indirectly influence the process through its correlation with battery voltage. Voltage modulation is primarily based on the system's ability to sustain the set point voltage without exceeding current limits, thereby reducing the risk of overcharging. In some embodiments, the BMS may also communicate additional variables such as internal temperature or state of health (SOH), which may further inform charging voltage selection and contribute to system efficiency and battery longevity.

When charging a lithium-ion battery, the pre-charge phase may be initiated when the battery management system (BMS), as described above, determines that the cell voltage has dropped to a predetermined threshold, such as approximately 3.0 volts per cell. At such low voltages, lithium-ion cells are chemically unstable and more susceptible to permanent damage, such as lithium plating, if charged too aggressively. Therefore, to protect the battery, the charger does not reduce the final voltage target, but rather limits charging current to a small fraction of the normal rate, often around 0.05C to 0.1C, as opposed to the typical 1C. C-Rate is a known manner of describing recharging a battery. The formula is C rate=I/Capacity which is A/amp-hrs. For instance, A 1C rate suggests an ability to charge a battery in 1 hour up to its maximum capacity using x number of Amps or Current. This has been a challenge for prior art small generators as the Li 6T battery can accept over 120 Ah for almost an hour. Without a 120A source, the battery will shut down most small generators. For example, military vehicles typically have at least 300A alternators (very large, supplying internal systems, etc.).

In the present system/method, the relatively "gentle" current gradually restores the cell to a safe operating condition, such that when the cell voltage rises above the minimum threshold (e.g. approximately 3V per cell), charging may automatically transition to the "constant-current" phase, in which full charging current of 1C may be applied. While different lithium-ion cells have varying "nominal" voltages, depending on the particular chemistry of the cell, lithium-ion batteries may have an approximate typical nominal voltage of 3.7V, ranging from 3.2V to 3.8V, a typical approximate maximum voltage of 4.2V, ranging from 3.6V to 4.4V, and an approximate typical minimum safe voltage ranging from 2.5V to 3.0V.

Lithium-ion cells themselves are passive electrochemical devices and do not determine which charging phase is appropriate. Rather, the appropriate charging phase may be controlled externally by the charger and/or the BMS, as described above. In some embodiments, the BMS may continuously monitor individual cell voltages, pack voltage, temperature, and current flow using sensors. The BMS and charger determine which charging phase is active, and therefore how much current to deliver to the battery.

Once the battery cell voltage reaches 3.0V, as detected by the charger and/or BMS as described above, the charger may shift to a second, "constant current" charge phase. In the "constant current charge phase", the charger applies a steady, controlled current to the battery. In embodiments wherein the battery does not begin charging from a fully drained state, such that each cell has a voltage greater than 3V, the first "pre-charge" phase may be skipped. While voltage, not SOC, is the determining factor for selecting the battery's charge phase, in some embodiments, a voltage of 3V may be reached when the battery reaches a SOC ranging from 2% and 5%, such that the "pre-charge" phase may be skipped. Typically, minimum state of charge/generator turn on is targeted around 20% (SOC). A battery SOC of 2% to 5% could be damaging/nearly catastrophic to battery health (depending on battery-type).

When the battery begins charging in the second 'constant current' phase—regardless of whether the initial 'pre-charge' phase was skipped—the charging current is held relatively constant at a high level, typically on the order of 0.5C-1C, depending on the battery's capacity. As the battery charges, the internal resistance of the battery increases, making it harder for the constant current to flow into the battery from the power source, such as the generator. Therefore, to maintain the current steady state against the rising resistance, the voltage may need to increase.

Once the battery cell voltage reaches approximately 3.0 V, as detected by the charger and/or battery management system (BMS), the charger transitions to the second stage, known as the constant-current (CC) phase. In this phase, the charger actively regulates the charging current, for example, by using closed-loop control circuitry. In some embodiments, this regulation may be achieved via pulse-width modulation (PWM) of a switching power supply or by adjusting the duty cycle of semiconductor switches to maintain the current at a predefined setpoint. For most lithium-ion cells, the full charging current during the "continuous current" phase is around 0.5C to 1C. The CC phase continues until the battery voltage rises to the upper threshold, typically 4.2 V per cell for standard Li-ion chemistry, at which point the charger switches to the next phase, the constant-voltage phase.

The "constant current" phase may continue until the battery reaches a target voltage of approximately 4.2V per cell, after which the system may transition to the third "constant voltage" phase, wherein the charger maintains a fixed voltage, typically, 4.2V for a lithium-ion cell, the maximum safe voltage the battery can handle. As the battery continues to charge at the fixed voltage, the current naturally decreases as the battery resists taking in more charge as it nears full capacity. Charging in CV mode continues until the current drops to a predefined threshold, at which point charging is complete.

A lithium-ion battery charging profile graph is shown in FIG. 1, showing how voltage, current, and charge capacity change over time when charging at a rate of 1C (approximately 1 hour). The horizontal "x" axis 11 represents the progression of charge time in hours. The interior left vertical "y" axis 12 represents cell voltage. The exterior left vertical "y" axis 13 represents the charge current (measured in mA), and the right "y" axis 14 represents the percentage of charge capacity.

As shown in FIG. 1, the lithium-ion battery charging profile graph displays multiple curves representing various measurements obtained during the charging cycle, including solid cell charge voltage curve 15, dotted charge current curve 16, and dashed charge capacity curve 17. At the beginning of the charging process 18, as seen in FIG. 1, dotted charge current curve 16 indicates that the charger supplies a constant current at 1000 mA, while solid cell voltage curve 15 shows the cell voltage rising rapidly (as the SOC rises) from about 3.0 volts to 4.2 volts, such that voltage increases from 3.0 volts (a SOC of approximately 2%-5%) to 4.2 volts (a SOC of approximately 80%) within, in some exemplary embodiments, the timespan of an hour and a half 19. This stage, the "constant current phase", as described above, allows the battery to charge quickly, as shown by dashed capacity curve 17, wherein charge capacity rises from 0% to 75% within the time span of an hour and a half 19.

As seen in FIG. 1, once solid cell voltage curve 15 reaches the charger's "float voltage", the maximum safe voltage, of approximately 4.2 volts, at a state of charge of approximately seventy percent and eighty percent 29, the charging process transitions to the "constant voltage" phase. At the beginning 30 of the "constant voltage" stage, the solid cell voltage curve 15 levels off, holding voltage steady, while the dotted charge current curve 16 steadily declines as charge current tapers down toward zero. Concurrently, dashed charge capacity curve 17 continues to climb more slowly, indicating that the battery is approaching full capacity. By about 2.5 to 3 hours, the black dashed charge capacity curve 17 reaches 100 percent, indicating a fully charged battery.

During the second "constant current" phase, Li6T batteries, as are preferred in military settings, may demand an upward of 300A of current, far exceeding the capacity of small generators, which in some embodiments have an approximate preferred maximum capacity of providing only 75A-85A of current. With such high current demands, a small single-cylinder diesel engine, such as the portable engine described herein, cannot effectively charge a Li6T battery during the "constant current phase", and particularly, in some embodiments, when the battery is at a state of charge below forty percent. Therefore, as is currently known in the art, when a small, single-cylinder diesel engine is used to charge a Li6T battery, there is significant stress on the engine, overwhelming the generator and causing the engine to stall.

To prevent overloading, the herein described system enables a single-cylinder diesel engine to charge a Li6T battery during the constant current phase, safely, without requiring the engine to provide the typical 300A of current to a Li6T battery, by programming generator software with a "high amperage algorithm", such that the software monitors the generator current output, modulating voltage as necessary to prevent current from spiking beyond the generator's preferred maximum range of 75-85A.

Figure 2:
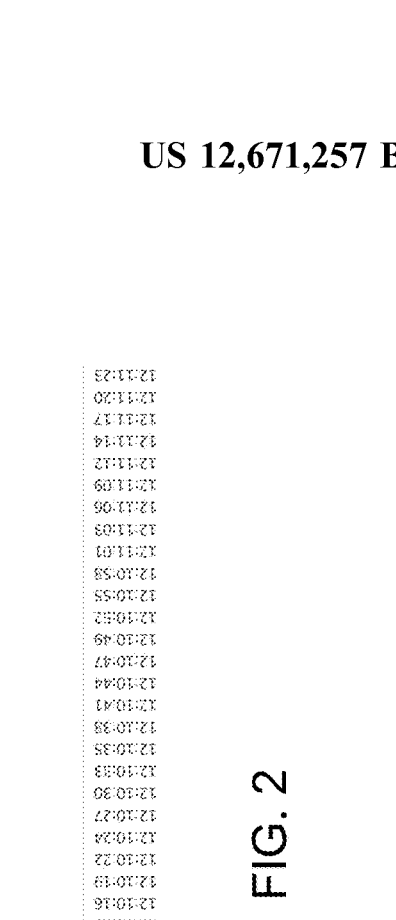
FIG. 2 is a graph illustrating modulations in current and voltage over time when using the herein-described algorithm to modulate voltage when charging a lithium-ion battery using a single cylinder engine.

As shown in FIG. 2 and described below, the "high amperage algorithm" may control software during the "constant current" phase 20 of charging, thereby preventing current from surging to 300 amps, despite the low internal resistance. The output voltage is modulated, pulsing the current, as further described herein, and preventing the engine from becoming overwhelmed by a surge of current, thereby preventing stalling.

FIG. 2 shows a graph of the generator's output voltage when the software is programmed with the high amperage algorithm described herein. FIG. 2 illustrates both the high-amperage constant current phase 20 and the high-amperage constant voltage phase 21. The high amperage horizontal "x" axis 22 represents the progression of charge time in hours. The high amperage left vertical "y" axis 23 indicates the generator's direct current (DC) output voltage, while the right vertical "y" axis 24 represents the generator's output current in amperes. As seen in FIG. 2, the high amperage algorithm-based charging profile graph illustrates two time series, such that the graph reflects changes in amperage and voltage when using the herein described high amperage algorithm, and a small diesel engine, to charge a battery at a low state of charge, for example, at approximately twenty percent charge.

In some embodiments, to modulate the voltage, the software system may monitor real-time electrical load demand by measuring current drawn from the generator. Additionally, the software may also reference the mechanical capacity of the generator's engine. Based on the electric load demands and the mechanical capacity of the generator's engine, herein referred to as "inputs", the software may control the generator output voltage through a modulation algorithm, such that when the measured current exceeds predefined thresholds relative to engine capacity, the software may reduce the output voltage, preferably in a stepwise or cyclical manner, to prevent engine overload or stalling. Such voltage modulation effectively "pulses" the power delivery, allowing the system to maintain stable operation under varying load conditions. The pulse method preferably provides sufficient current to charge the battery, effectively charging a Li6T battery without requiring a large, bulky engine that is capable of delivering 300A of current without stalling.

A first gray time series 25, represents changes in amperage over time, and a second black time series 26, represents changes in voltage over time. As illustrated in FIG. 2, variations in amperage in first time series 25 may be depicted as negative values, the negative sign indicating current flowing out of the generator. For example an amperage of negative sixty refers sixty amps. of current leaving the generator. As seen in FIG. 2, when pulsing the voltage using the high amperage algorithm described herein, the software is programmed to "pulse" and drop the outgoing voltage when the current exiting the generator rises above approximately 85 amps, thereby preventing the engine from stalling. In preferred embodiments, pulses occur quickly, such that after dropping the voltage, the algorithm restores the voltage in some embodiments, to within approximately one hundred milliseconds. In embodiments, where the amperage is still above a predetermined threshold, the algorithm prompts the software to "pulse" the voltage again, thereby continuing the pulsing cycle until the amperage falls below the predetermined threshold.

As seen in FIG. 2, as time increases and the state of charge rises, pulse frequency may decrease, as less power is required to charge the battery as it fills. Once the battery reaches the high amperage "continuous voltage" phase, the pulse frequency decreases significantly.

In some embodiments, the herein described high amperage algorithm may be programmed into software to control a variable voltage regulator coupled to an alternator, and particularly the rotor's field coil, such that the strength of the magnetic field may be regulated when the software, as described above, adjusts the current supplied to the rotor's field coil, as described in greater detail below.

In some embodiments, an alternator voltage regulator may modulate the current flowing through the rotor's field coil, such that as the modulating current respectively strengthens or weakens the rotor's magnetic field, the alternator's output voltage is varied, thereby "pulsing" the voltage. In preferred embodiments, the alternator voltage regulator may be coupled to, or otherwise programmed with, the control software programmed with the high amperage algorithm, such that the control software sends commands to the voltage regulator, directing the voltage regulator's "voltage set point", thereby instructing the voltage regulator as to whether to maintain or adjust field current.

In some embodiments, as shown in FIG. 2, the herein described algorithm may utilize the following thresholds. When the amperage rises above approximately 85A, the voltage may drop to approximately 26V. In preferred embodiments, after the voltage drop, the software may restore the voltage to about 29V, preferably within one hundred milliseconds. If the amperage remains above about 85A after a pulse, the software may trigger the generator to pulse the voltage again, as further described below. This cycle of pulses continues until the amperage stabilizes below 75A.

In some preferred embodiments, the role of the software in enabling the gen-set to withstand modulations in voltage draw is as follows. In some embodiments, the software system may monitor real-time electrical load demand by measuring current drawn from the generator. Additionally, the software may also reference the mechanical capacity of the generator's engine. Based on the electric load demands and the mechanical capacity of the generator's engine, herein referred to as "inputs", the software may control the generator output voltage through a modulation algorithm, such that when the measured current exceeds predefined thresholds relative to engine capacity, the software may reduce the output voltage, preferably in a stepwise or cyclical manner, to prevent engine overload or stalling. Such voltage modulation effectively "pulses" the power delivery, allowing the system to maintain stable operation under varying load conditions.

In preferred embodiments, as the battery approaches full charge or the Constant Voltage charging phase, and the load demand may decrease, the software may increase the duration for which the generator may maintain the set point voltage before initiating the next voltage reduction pulse. As the current demand increases, the software may increase intervals between pulses. The software may continuously repeat the monitoring and modulation cycles to optimize generator performance. If the size of the load does not require any pulsing normally during the CV charging phase, the software may cease the pulse pattern, allowing the generator to run without modulating cycles.

In preferred embodiments, the software may modulate engine output by controlling a variable voltage regulator coupled to the alternator, and particularly the rotor's field coil. In some embodiments, the alternator generates alternating current as a rotor, positioned within a stator, rotates to produce a changing magnetic field that induces voltage in the stator windings. In such embodiments, the magnitude of the alternator's output voltage is directly proportional to the strength of the magnetic field generated by the rotor. The strength of the magnetic field may be regulated when the software, as described above, adjusts the current supplied to the rotor's field coil, as described in greater detail below.

In some embodiments, an alternator voltage regulator may modulate the current flowing through the rotor's field coil, such that as the modulating current respectively strengthens or weakens the rotor's magnetic field, the alternator's output voltage is varied. In preferred embodiments, the alternator voltage regulator may be coupled to, or otherwise programmed with control software, such that the control software sends commands to the voltage regulator, directing the voltage regulator's "voltage set point", thereby instructing the voltage regulator as to whether to maintain or adjust field current.

In some embodiments, as described herein, the control software may be configured to transmit electronic control signals to the voltage regulator, wherein the signals specify either a desired voltage set point or alternatively command the voltage regulator to directly adjust the current supplied, via the voltage regulator, to the alternator's rotor field coil. The voltage regulator may function as an intermediary device that interprets software-generated commands and modulates the rotor's magnetic field accordingly by varying the field current. Thereby, enabling regulation of gen-set voltage output in response to changing load and operating conditions.

The herein described system and method may be executed on any gen-set with any alternator and any voltage regulator, wherein the voltage regulator is a variable voltage regulator, such that the herein described software may adjust the voltage in response to changing load conditions.

In some embodiments, an exemplary alternator may be a heavy-duty, 24-volt, 120-amp unit, making it suitable for industrial and military applications. It is preferred that the alternator be engineered to perform reliably at low engine speeds to ensure consistent power delivery in idle or low-RPM conditions. A preferred alternator includes electromagnets in the rotor.

The alternator may include an 80 mm spool-mount configuration, allowing compatibility with various mounting brackets. It may be bi-directional, capable of operating effectively regardless of whether the engine rotates clockwise or counterclockwise. In some embodiments, the alternator may feature grounded polarity, allowing installation in standard 24 V electrical systems. A preferred heavy-duty alternator may also be relatively lightweight, for example, under twenty pounds, making it suitable for mobile or field-based applications.

In preferred embodiments, the alternator may be equipped with an integrated transistorized voltage regulator to provide a stable and modulated voltage output. Some variants may include a lamp terminal for connecting a charge warning light, enabling a human-machine interface or indicator system to display alternator status. A brush-type excitation system may be used, in which carbon brushes and slip rings physically transfer excitation current into the rotating field winding.

Further embodiments may incorporate a dual internal fan design, thereby enhancing airflow and cooling efficiency, particularly at low engine speeds. The alternator housing may be, but is not necessarily, treated with an e-Coating process to improve corrosion resistance and extend service life in harsh environments.

In some embodiments, the alternator may be coupled to an alternator voltage regulator, such that the alternator voltage regulator may be configured to adjust the current supplied to the rotor's field coil when the alternator's output voltage exceeds a user-defined predetermined limit. In some embodiments, the predetermined limit may be selected based on the voltage capacity of the battery being charged. Because the permissible charging voltage varies with battery chemistry, the highest and lowest allowable charging voltages may differ among battery types. In one exemplary embodiment, a lithium-ion battery may be charged within a voltage range of approximately 24 V to 29.4 V, with a typical preferred charging voltage between approximately 28.8 V and 29.4 V, depending on the specific battery variant.

To modulate voltage, as described above, a voltage regulator may be programmed with an algorithm, as described herein, such that the voltage regulator will modulate alternator output by adjusting the excitation current sent to the alternator's rotor, thereby controlling how much power the alternator generates.

In some embodiments, an exemplary alternator voltage regulator may continuously monitor alternator output, comparing it to a reference threshold, such that when alternator output exceeds a reference threshold, the alternator voltage regulator may be programmed to adjust rotor excitation current, such as through carbon brushes and slip rings.

To modulate alternator output and prevent current spikes, a voltage regulator may be programmed with a control algorithm that intentionally varies the excitation current delivered to the rotor. Rather than maintaining a fixed system voltage, the regulator may adjust the strength and timing of the rotor's magnetic field based on system demands. This modulation results in a pulsed output voltage from the alternator.

In some embodiments, the voltage regulator continuously monitors alternator output and compares it to predefined thresholds. If output conditions indicate a risk of current, the regulator reduces or temporarily disables excitation current to the rotor. Once safe or optimal conditions are restored, excitation current may be re-enabled, thereby modulating the voltage as needed.

In some exemplary alternator voltage regulator embodiments, the delivery of excitation current to the rotor's field winding may be achieved via carbon brushes and slip rings, which maintain an electrical connection between the stationary voltage regulator and the rotating rotor. In some embodiments, solid-state switching elements, such as power transistors, including but not limited to MOSFETs or IGBTs, as described below, may additionally or alternatively be used within the regulator to control when and how much current is sent through the interface. In some embodiments, transistors may act as high-speed electronic switches that can rapidly modulate the excitation current in response to the control algorithm, as described herein. A MOSFET, Metal oxide semiconductor field effect transistor, is a voltage-controlled semiconductor device which may switch or amplify electrical signals. MOSFETS include three terminals: a gate, drain, and source. When a voltage is applied to the gate, an electric field is generated, such that the electric field modulates the conductivity of a channel between the drain and source, allowing current to flow. MOSFETs are preferred in applications requiring fast switching, low gate drive power, and efficient operation at low to medium voltages.

An IGBT (Insulated-Gate Bipolar Transistor) is a voltage-controlled semiconductor device that combines the high-input impedance of a MOSFET with the high-current and low-saturation-voltage characteristics of a bipolar junction transistor. IGBTs include three terminals: a gate, collector, and emitter. Applying a voltage to the gate allows current to flow between the collector and emitter, thereby enabling control of high-voltage and high-current circuits. IGBTs are commonly used in power electronics applications where both efficient conduction at high current and reliable switching are required. While IGBTS provide high voltage handling capabilities, they switch more slowly than MOSFETs.

The following sequence is an exemplary embodiment of the procedure for charging a lithium-ion battery with the herein-described generator set and software. The following embodiment is exemplary in nature and not intended to limit the scope of the present disclosure. In some exemplary embodiments, wherein lithium-ion batteries with a voltage range of between 24 V and 29.4 V are being charged by the gen-set, the gen-set may execute a control sequence to modulate the voltage output as necessary. In preferred embodiments, voltage modulation may preferably include the use of pulsed voltage control to manage load and charging conditions. First, upon startup, the generator engine may reach a sufficient operating speed, and the control software may initialize communication with both the voltage regulator and the battery or battery management system (BMS). The control software may receive battery data, including voltage, temperature, and state of charge. Furthermore, the control software may determine an appropriate charging voltage set point based on the battery's chemistry and charging phase. The software may then issue commands to the variable voltage regulator to maintain the selected voltage set point. In response, the voltage regulator may adjust the current supplied to the rotor's field coil to vary the magnetic field strength and thereby achieve the commanded output voltage.

During charging, the software may continuously monitor alternator voltage, generator load, and engine performance. If load demand increases and the current approaches a defined limit, the software may temporarily instruct the alternator voltage regulator to reduce the voltage set point, thereby lowering alternator output and preventing engine overload. This reduction may be followed by a return to the original set point once the load decreases, thereby resulting in a pulsing modulation of voltage output. In some embodiments, such as when charging a battery, as load demand decreases (for example, as battery charge increases), the duration for which the generator holds the commanded set point may lengthen, and the interval between pulsing events may increase. Once the load decreases, the software may restore the voltage set point to its optimal level. In some embodiments, as the battery nears full charge, the BMS may request a lower voltage, prompting the software to adjust the set point accordingly. In some embodiments, when charging is complete, the software may either maintain the reduced voltage or direct the gen-set to shut down, thereby completing the charging cycle.

In some embodiments, determining whether the engine should be running may be depend on the state of the bus voltage. Bus voltage refers to the electrical potential present on the main distribution bus of a generator set, which serves as the central point for delivering power to connected loads and charging the system battery. Within generator systems, bus voltage provides an indication of the balance between generated power, load demand, and battery state of charge (SOC). When the generator output sufficiently meets or exceeds load requirements, the bus voltage may rise toward its upper limit, whereas increased load or insufficient generation causes the bus voltage to drop.

In certain embodiments, the bus voltage may be continuously monitored by the control software such that, if voltage is high while current demand remains low, the generator will automatically shut down to avoid extended operation at very low loads. During such a shutdown, the generator's onboard battery may temporarily support the connected load. In preferred embodiments, if the bus voltage subsequently drops to a predetermined threshold, the generator will self-start and resume supplying power. Additionally, the voltage regulator may rely on deviations in bus voltage to adjust alternator output, initiate pulsing sequences, and/or modify charging behavior.

In some embodiments, the bus voltage may serve as a primary feedback parameter for determining whether the alternator is maintaining the predetermined or preprogrammed preferred voltage output. When the bus voltage exceeds a programmed threshold, the control software may respond by reducing the voltage set point or shutting the engine off temporarily. Alternatively, when the bus voltage falls below a lower threshold, the software may increase the voltage set point, triggering additional generator output to meet load demand.

The herein described generator may be initiated via any suitable means of activation, including but not limited to wireless communication protocols such as Wi-Fi, remote start signals (e.g., from a key fob or mobile application), electric start via physical switches or relays, Ethernet-based network commands, or through communication protocols such as CAN (Controller Area Network) or CANbus. Additional initiation methods may include, but are not limited to Bluetooth, satellite or cellular network signals, programmable logic controllers (PLCs), scheduled timers, motion sensors, or any automated or manual trigger capable of signaling the generator's control system to initiate a start sequence.

Similarly, the generator may be shut down via any suitable means of suspension, including but not limited to wireless communication protocols such as Wi-Fi, remote stop signals (e.g., from a key fob or mobile application), electric stop via physical switches or relays, Ethernet-based network commands, or through communication protocols such as CAN (Controller Area Network) or CANbus. Additional suspension methods may include, but are not limited to Bluetooth, satellite or cellular network signals, programmable logic controllers (PLCs), scheduled timers, motion sensors, or any automated or manual trigger capable of signaling the generator's control system to shut down.

In some embodiments, the described generator may operate under various control modes, which may be initiated via any suitable means of activation, including but not limited to battery charge mode, remote start mode, normal mode, cold start mode, and manual mode. Battery Charge Mode may be a preferred mode for optimizing generator operation within a hybrid power system. In some embodiments, Battery Charge Mode may preferably be selected when using an external battery, battery bank, or hybrid energy storage module (ESM), and optionally with renewable energy sources. Battery Charge Mode may prompt the software in a generator set, preferably a hybrid generator set, to monitor the generator set's bus load and internal batteries and adjust the bus load based on their status.

In some embodiments, when operating in Battery Charge Mode, the software continuously monitors operating conditions to optimize performance and prevent engine damage. In Battery Charge Mode, the generator may, in some embodiments, start only when the detected load sufficiently utilizes an adequate portion of the generator's capacity, thereby avoiding wet-stacking caused by prolonged underloading. Additionally, the generator-set software, as described herein, may be programmed to switch to Battery Charge Mode when bus voltage drops below a predetermined threshold. The generator-set software, as described herein, may also be programmed to shut off the generator when the output power falls below a preset limit for a defined period, thereby preventing operation under conditions that could lead to underloading or wet stacking.

Remote Start Mode may be a preferred operating mode for remotely commanding the electric start and stop from an external hybrid controller. In Remote Start Mode, the external hybrid controller may determine start/stop scheduling, for example, based on energy storage state of charge (SOC) or an alternative rule set programmed into the software. In some embodiments, start and stop commands may be sent using a CANbus, a 5V transistor-transistor logic (TTL) signal, or other such remote communication methods. In some exemplary embodiments, if the gen-set is placed in Remote Start Mode, the gen-set will remain dormant until a remote start signal, such as but not limited to, a 5V signal is received, after which it will run until the signal is terminated.

The software controlling the gen set's Remote Start Mode may, in some exemplary embodiments, function as an interface between the generator set and an external hybrid controller. The software may monitor and scan for an external 5V TTL input signal, such that the signal may command the gen-set to start or stop operation. In some embodiments, upon entering Remote Start Mode, the gen-set's software may enter a continuous monitoring state, scanning the input line for the presence of the start signal.

The circuit board and software to operate the gen-set may include a sensor to read state-of-charge of a target battery. When the target battery is has a CAN bus (as is common with Li batteries), the circuit board and software read SOC directly from the battery's CAN bus. This information on SOC read from the battery may then be fed into the algorithm to determine the proper charging (e.g., pulsing) and can also be used to diagnose issues with the gen-set and/or battery. This allows very precise SOC with Li batteries. Batteries without such a CAN bus or similar system to read the SOC, such as batteries with other chemistries, voltage (reading/sensed) to/from battery remains the primary input to drive the gen-set power algorithm.

In such exemplary embodiments, when the software detects the TTL start signal, the software may initiate the engine start sequence by executing control commands to engage the motor and prepare the gen-set for operation. While the TTL signal remains active, the software may maintain the gen-set in an operational state, continuously verifying the input signal and monitoring system status. Upon detecting the termination of the TTL signal, the software may initiate a controlled shutdown sequence, allowing the generator to disengage from the bus and the system to reenter standby mode.

In preferred embodiments, each mode may be governed by unique software parameters, such that the generator set may not require a fixed minimum power level to sustain engine operation; instead, engine performance and control may be managed based on the operating conditions and predefined parameters determined for each mode. For example, in some exemplary embodiments, in "Battery Charge Mode", generator set auto-start and stop may be governed by onboard logic based on parameters such as bus voltage, state of charge (SOC), open-circuit voltage, or other battery data obtained from the battery management system (BMS). In some exemplary embodiments, in "Remote Start Mode", generator operation may be controlled by an external hybrid controller operating under a predetermined rule set.

In one exemplary embodiment, a hybrid generator operating in "Battery Charge Mode" may initiate an automatic start sequence when the monitored bus voltage falls below approximately 24V, thereby protecting the generator's internal starter battery pack. Upon issuing the engine start command, the hybrid generator may temporarily isolate itself from the bus for a period, such as but not limited to approximately up to ten seconds, to stabilize internal systems. After the isolation period, a hybrid generator may reconnect to the bus and deliver power to meet the connected load. When the total load on the bus subsequently drops below approximately 100 W, a hybrid generator may automatically shut down and transition back to a monitoring state, such that the generator's software may continue to observe bus conditions. This start-stop cycle may be repeated as necessary to maintain proper bus voltage and load support, and the cycle may continue until the generator is either manually stopped or removed from Battery Charge Mode.

In some exemplary embodiments, in both exemplary modes, namely "Battery Charge Mode" and "Remote Start Mode", an excess load protocol may engage when detected loads reach a threshold of approximately between 70A and 85A. Excess load protocol activation points and operational limits may further vary based on other conditions, such as but not limited to engine condition, ambient temperature, and fuel type. For example, when operating on jet fuel, which burns at a higher temperature and provides reduced lubrication compared to No. 2 diesel, the engine may experience derating, resulting in reduced maximum power and efficiency, thereby influencing control responses and load management.

In some embodiments, the gen-set may be operated under "Normal Mode," wherein "Normal Mode" is an operating mode where the generator set runs as a continuous power generation system, such that the gen-set remains actively running and producing power without interruption, regardless of battery state of charge, bus voltage, or other external signals. Normal Mode may be preferred when constant power output is required, or when a user wants to override the software's automated pulsing logic. In some embodiments, when a gen-set is running on "Normal Mode", the software may be programmed to ignore automatic shutoff conditions, thereby keeping the generator running continuously until manually stopped or commanded to stop by an operator or external control system.

In some embodiments, when "Normal Mode" is selected, the generator-set may be initiated by a 24V electric start, such as but not limited to pressing a start button or sending an electric signal via the control system. Initiation may be followed by continuous operation regardless of the load being drawn, until the generator is manually stopped via the control system interface.

The following procedure is exemplary in nature and not intended to limit the scope of the present disclosure. In some embodiments, when "Normal Mode" is selected, the control system may automatically initiate a pre-start sequence, which may, but does not necessarily, include checking fault diagnostics, fuel pump priming, and activation of the cooling fan, after which the electric starter may be initiated. In some embodiments, the pre-start sequence may, but does not necessarily, take up to ten seconds. Once initiated, under "Normal Mode," the generator may continue to operate indefinitely unless manually stopped by the user via the HMI (human machine interface) or associated control system interface, or any other stop signal, including remote stop signals, Wi-Fi-based stop signals, manually input stop signals, Ethernet-based stop signals, etc. In some embodiments, if the engine fails to start in "Normal Mode", the system may automatically retry to restart the engine four successive times.

In embodiments wherein the engine fails to start after four automatic successive restart attempts, the system may enter a fault state and return to the main menu, requiring the user to re-select "Normal Mode" to retry the start sequence. In some embodiments, failure to start may be due to a low starting battery or low main bus voltage (for example, below 23V). In such embodiments, the system may require auxiliary support for "Normal Mode", including but not limited to an external battery pack, a NATO Jump Start, or operation in "Manual Mode", as described below.

In some preferred embodiments, once the generator is successfully operating in "Normal Mode", the software may be programmed to close the relay connecting the generator to the load, thereby allowing electricity to flow. In embodiments wherein the load is within nominal system limits, preferably below 75A, a regulated 28.5V output may be delivered. In embodiments wherein the generator software detects a load exceeding predetermined limits, such as but not limited to 75A, the generator software may lower and modulate output voltage, such that the voltage output is in a preferred range of 26-28.5V.

In preferred embodiments, the generator control software may be configured to manage load connection and voltage regulation during operation in "Normal Mode." Once the engine starts on "Normal Mode," the software may actuate an output relay to connect the generator to the electrical load, thereby enabling current flow. If the connected load remains within system limits, preferably not exceeding approximately 75A, the generator may deliver a regulated output voltage of approximately 28.5V. In embodiments wherein the software detects that the load exceeds the predetermined current threshold, such as, but not limited to, when charging a depleted lithium-ion battery or battery bank, the control system may adjust and modulate the generator's output voltage. In such embodiments, the output voltage may be reduced and maintained within a preferred operational range, such as, but not limited to, approximately 26 to 28.5V.

In some embodiments, such as when operation in "Normal Mode" fails, for example, due to insufficient starting battery or low main bus voltage, the user may instead choose to operate the gen-set in "Manual Mode." When operating in "Manual Mode," the gen-set may be initiated via a recoil "pull" start, rather than an electric start. "Manual Mode" may allow users to directly attempt engine ignition without automatic intervention from the control system. After the engine is actuated manually, such as, but not limited to, via a recoil "pull start, the engine may preferably continue operating in "Normal Mode" as described herein.

In some embodiments, such as when ambient temperatures fall below approximately thirty-two degrees Fahrenheit, it may be preferred to operate the generator under "Cold Start Mode". Under "Cold Start Mode", the aforementioned pre-start sequence may be modified to include intake air preheating and extended engine cranking to counteract reduced battery performance and increased resistance in engine components caused by low temperatures.

In some embodiments, under "Cold Start Mode," the engine may crank in cycles of approximately thirty seconds, followed by rest periods of approximately ten seconds between cranking intervals. In preferred embodiments, the system may execute a cold start sequence involving up to five minutes of alternating cranking and rest cycles, after which the "Normal Mode" sequence and software may be initiated, such that the gen-set will switch to run in "Normal Mode." In preferred embodiments, the gen-set may automatically continue to "Normal Mode" after "Cold Start" is successfully initiated.

To support cold start cranking in temperatures ranging between −20° F. and 32° F., it is preferred to use a 24V auxiliary battery pack connected to the Auxiliary Battery Post Terminals. Alternatively, a jump start may be performed using a 24V external battery or a vehicle bus connection.

As described herein, voltage modulation is a preferred method for preventing excessive current draw. However, in alternative embodiments, current may be alternatively, directly modulated to prevent current spikes that may cause engine stall. In some exemplary embodiments, current may be alternatively modulated as described below.

In some exemplary embodiments, the voltage regulator of the alternator may be alternatively bypassed or replaced, such that regulation of the alternator output may be additionally, or alternatively, achieved by direct modulation of the alternator field current. In such configurations, a controller may be operatively coupled to the alternator field winding through a driver circuit, such as a MOSFET-based switching element, to adjust the excitation current applied to the rotor. The controller may further comprise voltage and current sensing circuitry configured to monitor system voltage at the battery terminals and, in some embodiments, alternator output current. Based on these sensed values, the controller may execute an alternative closed-loop control algorithm, such as proportional-integral (PI) or proportional-integral-derivative (PID) regulation, to maintain the system voltage within a desired operating range. In some embodiments, a ballast resistor may be additionally or alternatively incorporated into the system.

As set forth herein, the term "approximately" is typically used to describe arrange of +/−5% of target quantity. Exemplary embodiments of the present invention may include modular lightweight 2 kW/28V DC diesel hybrid power generators providing utility spot power generation to Li-ion and/or lead-acid battery for charging. This can be used in applications to power communications, surveillance, sensors, mobile air defense, etc. and the generator may be used to carry on and export power from vehicles or use at fixed sites, with intended operation sound at 75-80 dB at seven meters distance. Accessories for use with the gen-set may include a 20 L plastic jerry fuel can, weather cover, transport case, external silencer, and/or auto-start cable with CAN-Bus. A gen-set may be a single cylinder, air-cooled engine, such as one with approximate Power Output of 28V DC 1.8 kW (nominal)/2.1 kW (peak), a Starting Power of 24V 6.3 Ah/130 CCA AGM internal battery, NATO 28V jump start, with optional Auxiliary 24V battery interface for cold temperature operations and hybrid remote start augmentation. A Power Interface is preferably a 28V DC Export Power Receptacle, such as NATO STANAG 4074 with auxiliary battery IN/secondary DC OUT using M6 post terminals and a starter battery trickle charge receptacle: SAE 2-pin. Power quality is preferably in accord with Mil-Std-1332B DC utility power. Power protection is preferably at an export power of 120A/48 VDC manually-switchable/resettable CB, including an Emergency Stop (E-STOP), auxiliary battery isolate switch/60A CB, and Starter Battery Isolate Switch/60A CB. Petrochemical fuels may be used, such as JP5-JP8, Jet A/A1, F34, F35, F44, F54, F63, F64, F65, DL-1, DL-2, kerosene, US No. 1 & 2, EN 590, as is known in the art for such engines. Preferred fuel consumption is approximately 0.25-0.30 or 0.27 gallons per hour (at rated load). An oil capacity may be 0.8 L. An exemplary typical system may be sized 19.69"L×15.75"W×17.72"H (give or take 20%), and from-factor weigh approximately 127.4 lbs. (Dry)|129 lbs. (Wet) (preferably, plus or minus 20-50%).

As is presently claimed, as system must be capable of performing the steps and functions set forth, and the method must include sufficient structure and elements to conduct the recited performance.

We claim:

1. A generator set system, comprising:
an engine coupled with an alternator;
a variable voltage regulator coupled to the alternator supplying output power with a voltage output; and
a control system connected to the variable voltage regulator, said control system configured to monitor and respond to deviations in a power demand, whereby when the power demand deviates from a threshold level, the control system signals the variable voltage regulator to modulate the voltage output from the alternator;
wherein when the control system detects a current draw in excess of an upper threshold, the variable voltage regulator modulates voltage output from the alternator, wherein voltage output temporarily cycles between a lower voltage range and an upper voltage range, until amperage draw stabilizes.

2. The generator set system of claim 1, wherein the load is a lithium-ion battery, wherein the voltage cycling occurs when the lithium-ion battery has an approximate state of charge of approximately twenty percent, until the lithium-ion battery charges reach an approximate range of seventy to eighty percent.

3. The generator set system of claim 1, wherein the load is a lithium-ion battery, wherein the voltage cycling occurs when the lithium ion battery has an approximate battery voltage of three volts per cell until the battery voltage reaches approximately four point two volts per cell.

4. A generator set system, comprising:
an engine coupled with an alternator;
a variable voltage regulator coupled to the alternator supplying output power with a voltage output; and
a control system connected to the variable voltage regulator, said control system configured to monitor and respond to deviations in a power demand, whereby when the power demand deviates from a threshold level, the control system signals the variable voltage regulator to modulate the voltage output from the alternator;
wherein the control system software is configured to modulate the generator output voltage in a stepwise manner via a variable voltage regulator, wherein the software defines a minimum voltage supported by the voltage regulator and establishes a target voltage set point, and wherein, upon detection of an excess current condition, the software commands the voltage regulator to reduce the output voltage to the defined minimum voltage and subsequently increase the output voltage toward the target voltage set point.

5. The control system of claim 4, wherein upon detection of an excess load condition, the control system software commands the variable voltage regulator to reduce the output voltage, and subsequently restore the voltage toward a predefined target voltage set point in a stepwise manner.

6. A generator set system, comprising:
an engine coupled with an alternator;
a variable voltage regulator coupled to the alternator supplying output power with a voltage output; and
a control system connected to the variable voltage regulator, said control system configured to monitor and respond to deviations in a power demand, whereby when the power demand deviates from a threshold level, the control system signals the variable voltage regulator to modulate the voltage output from the alternator;

wherein the control system adjusts the output voltage by controlling the variable voltage regulator, and wherein the output voltage is modulated in a stepwise manner based on the monitored electrical load and engine operating conditions.

5

* * * * *